(12) United States Patent
Shaw

(10) Patent No.: US 6,502,310 B1
(45) Date of Patent: Jan. 7, 2003

(54) CABLE INSULATION SLITTING TOOL

(76) Inventor: Christopher J. Shaw, 2393 Donna La., Pottstown, PA (US) 19464

( * ) Notice: Subject to any disclaimer, the term of this patent is extended or adjusted under 35 U.S.C. 154(b) by 0 days.

(21) Appl. No.: 09/591,478

(22) Filed: Jun. 9, 2000

(51) Int. Cl.[7] .............................................. H02G 1/12
(52) U.S. Cl. ........................ 30/90.4; 30/91.1; 81/9.44
(58) Field of Search ............................. 30/90.1, 90.4, 30/90.8, 91.2, 91.1; 81/9.4, 9.44, 9.51; 7/107

(56) References Cited

U.S. PATENT DOCUMENTS

| | | | | |
|---|---|---|---|---|
| 1,096,983 A | * | 5/1914 | Aaron | 30/91.1 |
| 2,386,327 A | * | 10/1945 | Martin | 30/91.2 |
| 4,083,105 A | * | 4/1978 | ViPond | 30/90.4 |
| 4,162,638 A | * | 7/1979 | McCord | 30/90.1 |
| 4,745,828 A | | 5/1988 | Stepan | 81/9.51 |
| 4,815,207 A | * | 3/1989 | Schwartzman | 30/90.1 |
| 4,920,830 A | | 5/1990 | Stepan | 81/9.51 |
| 5,009,006 A | * | 4/1991 | Sawyer et al. | 30/91.2 |
| 5,070,615 A | | 12/1991 | Michael, III | 30/90.8 |
| 5,172,620 A | | 12/1992 | Faust | 83/13 |
| 5,243,882 A | | 9/1993 | Stepan | 81/9.51 |
| 5,269,206 A | | 12/1993 | Yagawa | 81/9.51 |
| 5,377,564 A | | 1/1995 | Erlich | 81/9.44 |
| 5,414,931 A | | 5/1995 | Wollermann | 30/90.1 |
| 5,745,943 A | | 5/1998 | Bagley | 7/107 |
| 5,894,617 A | * | 4/1999 | Liou | 81/9.44 |

OTHER PUBLICATIONS

*Greenlee Full Line Catalog*, 1996, pp. 152–153 and 158–167.
*IDEAL General Catalog*, ISO 9001, 1997, pp. C–2 through C–10 and C21 through C24.
*Klein Tools*, Catalog No. 139.1, 1995, pp. 19–31.

* cited by examiner

*Primary Examiner*—Hwei-Siu Payer
(74) *Attorney, Agent, or Firm*—Woodcock Washburn LLP

(57) ABSTRACT

A tool for stripping the outer layer of insulation on a multi-wire cable such as romex, comprises a jaw and a claw, each being mounted to the rotating members of a plier-like apparatus. The claw has a sharp cutting edge, and the jaw holds the cable in position while it is being pierced by the sharp cutting edge of the claw. The plier-like apparatus closes the claw and jaw together, thus causing the claw to pierce the cable's outer insulation layer as it is held in the jaw. A user then pulls the cable through the jaw, causing the outer insulation layer to be slit as it moves past the claw. The jaw that holds the cable is in an offset position relative to the plier-like apparatus, such that the cable lies off to the side of the plier-like apparatus while a user pulls the cable through the jaw.

20 Claims, 3 Drawing Sheets

CABLE INSULATION SLITTING TOOL

FIELD OF THE INVENTION

The present invention relates generally to the field of electrical wiring, and, more particularly, to a tool for slitting the outer layer of insulation from a multi-wire cable, such as a Rome cable.

BACKGROUND OF THE INVENTION

Romex cable is a well-known medium for electrical wiring. Typical romex cable comprises three wires, two of which are individually insulated and one of which is non-insulated. The three wires are bundled together in an outer layer of insulation. The configuration of romex cable makes it particularly useful for wiring an AC circuit of the type commonly used in a building, because the three wires needed for such a circuit can be laid together as a single unit (i.e., the two insulated wires can be used for "hot" and "neutral," and the uninsulated wire can be used for "ground").

While romex cable provides a convenient means to lay three wires together over the length of a circuit, it is typically necessary at certain points in the circuit for an electrician to "unbundle" the three wires. For example, at the current source or at an outlet that will tap the current from the circuit, the hot, neutral and ground wires must generally be connected to separate terminals. In such situations, it is necessary for the electrician to slit the outer layer of insulation so that he or she can work with each of the three wires individually.

Traditionally, electricians slit multi-wire cables manually by using a pocket knife and a steady hand to slit the outer layer of insulation. Not only is this process physically strenuous, but additionally the electrician must be extremely careful not to strip or cut the individual wires—or cut himself—during the slitting process. Various devices to aid in the slitting process have been proposed. U.S. Pat. No. 5,745,943 (Bagley) proposes a device having a rounded recess with a protruding cutting blade. The multi-wire cable is inserted into the rounded recess and pulled along the cutting blade. However, the rounded recess into which the cable fits cannot be opened to accommodate insertion of the cable. Instead, the electrician must strenuously and/or awkwardly force the cable into the recess and past the cutting blade. Moreover, the device of the Bagley patent provides no means to use leverage to pierce the cable insulation with the cutting blade.

In view of the foregoing, there is a need for a system that overcomes the limitations and drawbacks of the prior art.

SUMMARY OF THE INVENTION

A cable-slitting device in accordance with the invention comprises a jaw into which a cable may be positioned, a claw, and a plier-like apparatus to which the jaw and claw are attached. The plier-like apparatus comprises two members rotatbly joined at a point, so as to permit the ends of the members to open and close with the rotating action of the members. The jaw is attached to an end of one member of the plier-like apparatus, and the claw is attached to the adjacent end of the other member. When the device is in the open position, the jaw and claw are separated sufficiently to permit a cable to be positioned in the jaw without interference from the claw. When the device is in the closed position, the jaw and claw are close together such that the claw is in contact with the outer layer of insulation of a cable that is positioned in the jaw. The device may be pulled along the length of a multi-wire cable such as romex in order to slit the outer layer of insulation.

In order to use the cable-slitting device, the members of the plier-like apparatus are rotated to the open position, thereby separating the jaw and the claw. A cable is then positioned into the jaw. The plier-like apparatus is then transformed to its closed position, thereby bringing the jaw and claw closer together. As the claw is brought closer to the jaw, it comes into contact with the cable's outer layer of insulation at a direction generally perpendicular to the cable, thereby piercing the insulation. Once the insulation is pierced, the user holds the cable-slitting device in one hand and the cable in the other hand. The user then pulls the cable and device in opposite directions, thereby causing the claw to be pulled along the length of the cable, which has the effect of slitting the cable's outer layer of insulation.

In a preferred embodiment of the invention, the jaw has a slanted surface and the claw has a curved inner surface. This configuration aids in permitting the claw to pierce the insulation layer so as not to touch the wires inside the cables.

In a further preferred embodiment, the claw and jaw are provided separate from the plier-like apparatus and are detachably mounted to the plier-like device with screws. This configuration aids in manufacturing by permitting the jaw and claw to be separately manufactured and then attached to a general-purpose plier-like apparatus.

In a further preferred embodiment, the jaw is mounted to the plier like apparatus off to the side of the rotating members, such that, as the cable is pulled through the jaw, it travels alongside the plier-like apparatus without coming into contact with the rotating members.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

A cable-slitting device in accordance with aspects of the invention provides a simple tool that may be used to slit the outer layer of insulation on a multi-wire cable such as romex.

Figure 1:
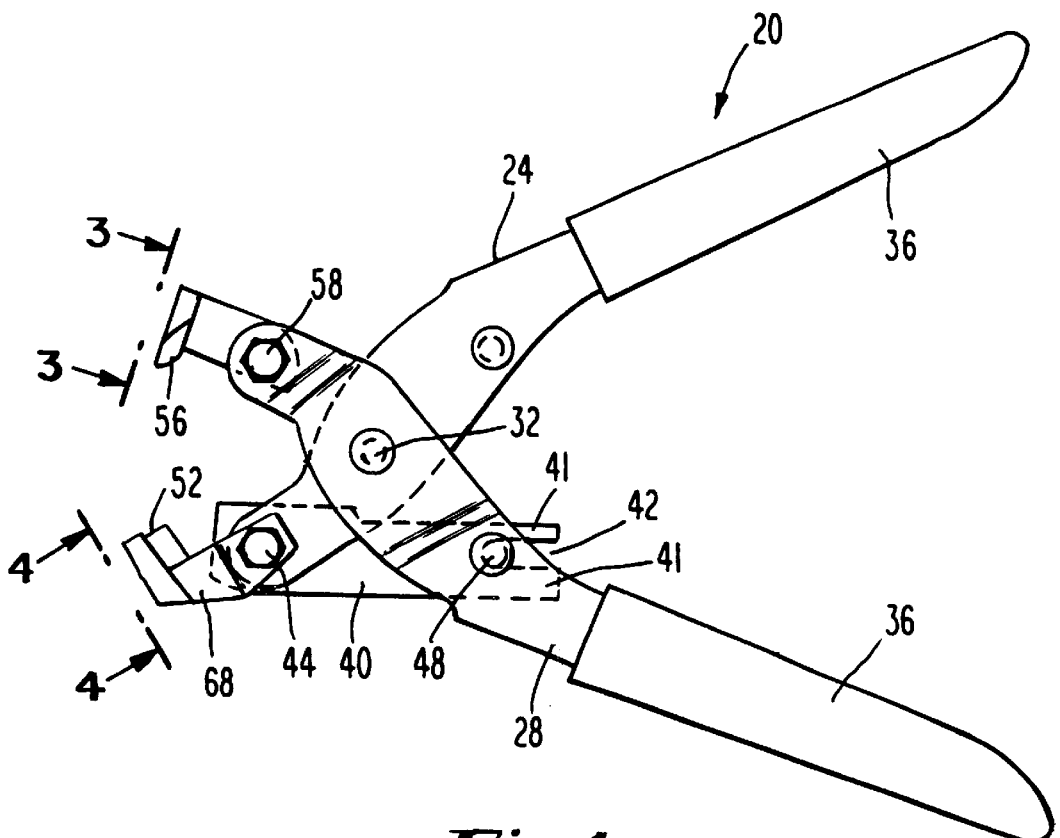
FIG. 1 is a plan view of a cable-slitting tool in accordance with the invention, with the tool being in its open position.

Referring to the drawings, wherein like numerals are used to indicate like elements throughout, there is shown in FIG. 1 a device 20 in accordance with the present invention for slitting the outer layer of insulation from a multi-wire cable. Romex is an exemplary type of cable whose outer insulation layer may be slit by device 20, although device 20 may be used to slit other types of multi-wire cables without departing from the spirit and scope of the invention. Device 20 comprises a plier-like apparatus, having a pair of members 24 and 28 that are rotatably attached to each other by means of pin 32, such that members 24 and 28 rotate relative to each other about pin 32. The rotating of members 24 and 28 defines an open position (depicted in FIG. 1) and closed position (depicted in FIG. 2). Members 24 and 28 are formed of a material that is sufficiently strong and rigid to resist bending or breaking under the force of the cable-slitting activity for which device 20 is designed. Preferably, members 24 and 28 are made of steel. Distal ends of member 24 and 28 are designed to be gripped comfortably by hand, and thus are covered by coverings 36. Coverings 36 are made of rubber, plastic, resin, or other material that increases comfort and reduces slippage when members 24 and 28 are gripped by hand.

Retainer bar 40 is connected to element 24 by means of bolt 44, and to element 28 by means of pin 48. Retainer bar 40 has a forked end 42 defined by a pair of tines 41. Tines 41 fit movably around pin 48 such that retainer bar 40 can both slide and rotate about pin 48. A hole (not shown) in retainer bar 44 rotatably receives bolt 44. Retainer bar 40 can rotate about bolt 44, but cannot slide relative to bolt 44. As can be observed with reference to FIG. 2, when device 20 is in the closed position shown in FIG. 2, retainer bar 40 abuts against pin 32, thus retaining elements 24 and 28 in a particular position relative to each other. As discussed below, it is important that jaw 52 and claw 56 maintain a minimum distance when device 20 is in the closed position. By preventing elements 24 and 28 from rotating past a certain position, retainer bar 40 effectively causes jaw 52 and claw 56 to maintain this minimum distance.

Figure 6:
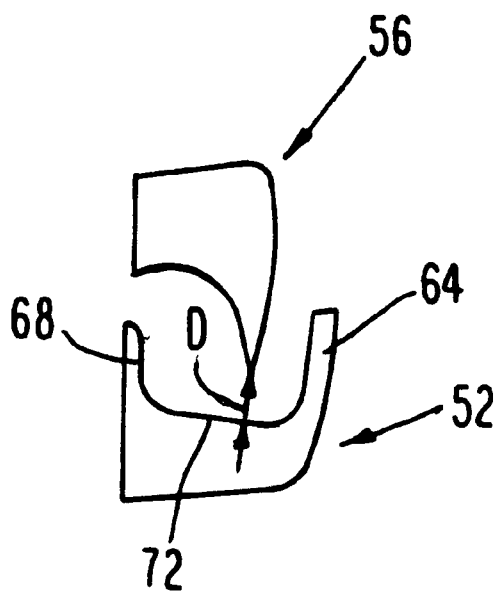
FIG. 6 is an elevation view of the claw and jaw portions of the tool of FIG. 2, shown in the plane of line 6—6.
Figure 7:
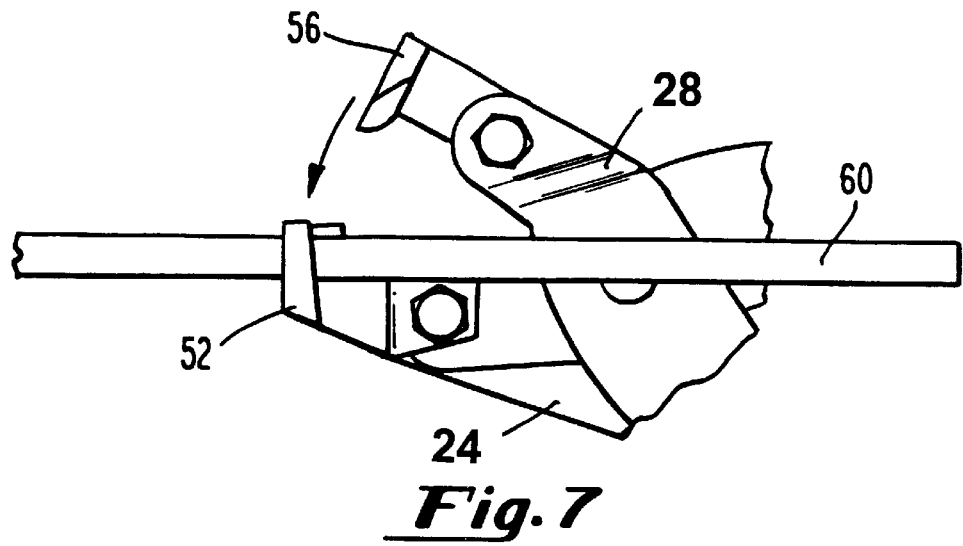
FIG. 7 is a plan view of the cable-slitting tool of FIG. 1, with a cable positioned in the jaw portion of the tool and the tool in its open position.
Figure 8:
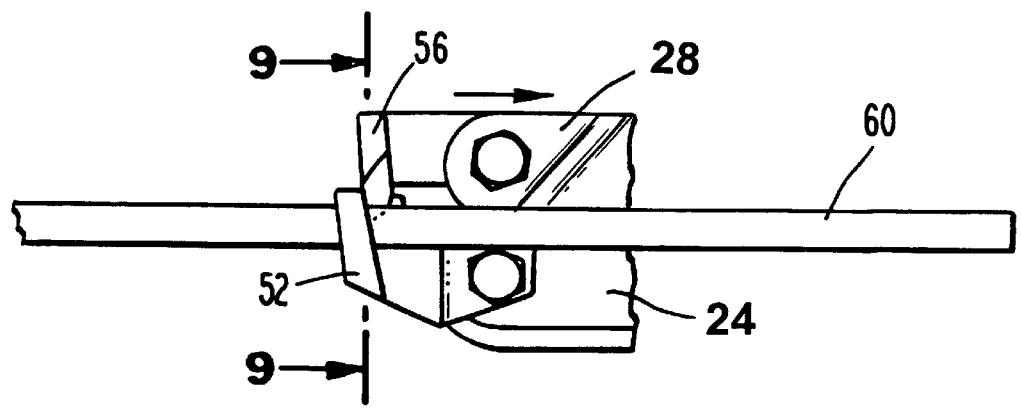
FIG. 8 is a plan view of the cable-slitting tool and cable shown in FIG. 7, with the tool being in its closed position.
Figure 9:
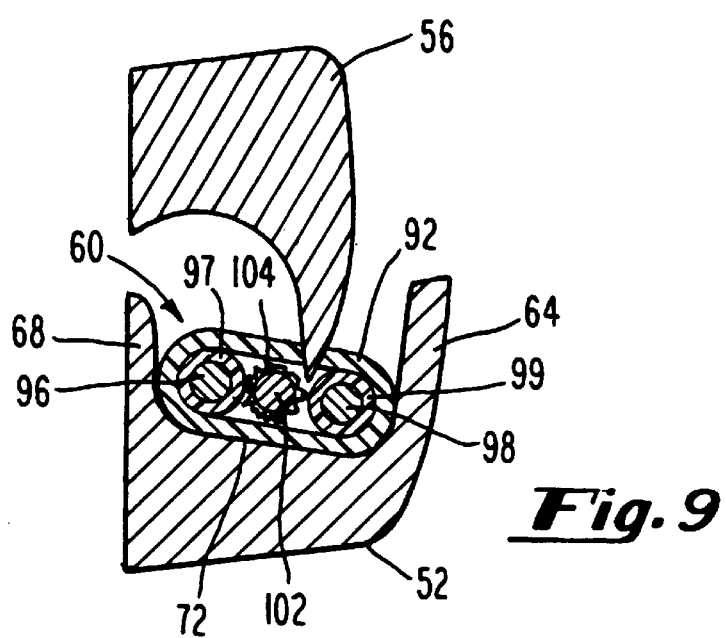
FIG. 9 is a sectional view of the cable-slitting tool and cable shown in FIG. 8, taken along line 9—9.

Jaw 52 is fixedly attached to element 24 by bolt 44. Jaw 52 holds a cable 60 in place during the cable-slitting process (as shown in FIGS. 7–9). Claw 56 is fixedly attached to element 28 by bolt 58. Claw 56 pierces and slits cable 60 during the cable-slitting process (as shown in FIG. 9). Referring now to FIGS. 3–4, 6, and 9, jaw 52 has a U-shaped recess 76 defined by a set of side walls 64 and 68, and by a bottom wall 72. The configuration of walls 64, 68, and 72 is such that jaw 52 can slidably receive cable 60. It is important that cable 60 be able to slide in jaw 52 (as shown in FIG. 8), but it is also important that cable 60 not have significant side-to-side movement relative to claw 56 as it slides through jaw 52. Thus, the configuration of walls 64, 68, and 72 is such that cable 60 fits snugly in U-shaped recess 76. Preferably, bottom wall 72 is slanted. As discussed below, a slanted bottom wall 72 holds cable 60 in a position during the slitting process that helps to prevent the wires inside of cable 60 from coming into contact with claw 56. Claw 56 has a sharp cutting end 80 and a wide portion 84. On one side of claw 56, wide portion 84 tapers toward sharp cutting end 80 through a first curved surface 88. On the opposite sides of claw 56, wide portion 84 also tapers back toward sharp cutting end 80 through a second curved surface 89. As discussed below, the curved shape of claw 56 helps to prevent claw 56 from coming into contact with wires inside of cable 60 during the cutting process.

Figure 2:
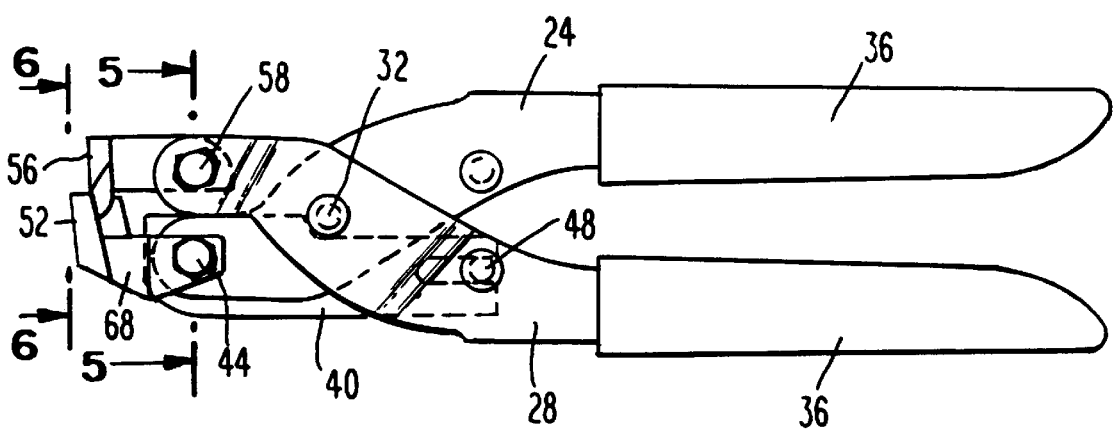
FIG. 2 is a plan view of the cable-slitting tool shown in FIG. 1, with the tool being in its closed position.
Figure 3:
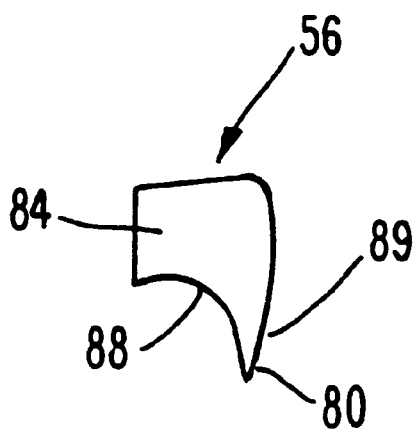
FIG. 3 is an elevation view of the claw portion of the tool of FIG. 1, shown in the plane of line 3—3.
Figure 4:
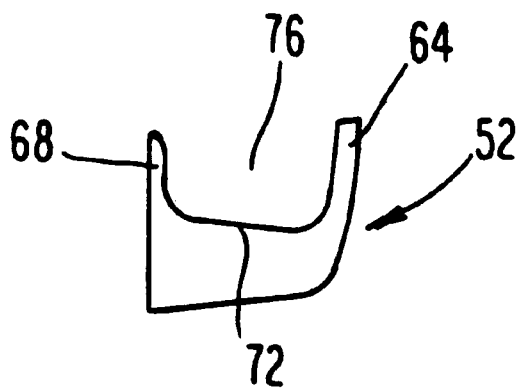
FIG. 4 is an elevation view of the jaw portion of the tool of FIG. 1, shown in the plane of line 4—4.
Figure 5:
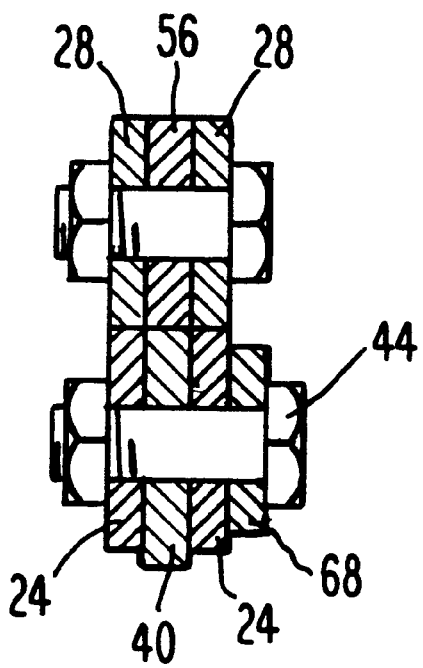
FIG. 5 is a sectional view of the tool shown in FIG. 2, taken along line 5—5.

It will be observed as shown in FIGS. 1 and 2 that wall 68 extends rearwards from U-shaped recess 76 and forms the portion of jaw 52 that attaches to element 24 by way of bolt 44. In a preferred embodiment of the invention, it can be seen in FIG. 5 that wall 68 is attached to member 24 so as to lie in a plane offset from the planes in which members 24 and 28 lie. In somewhat more detail, it can be seen in FIG. 5 that members 24 and 28 are each split at the location of the sectional view, with each member having two metallic branches in between which an object may be inserted. In the case of member 24, retainer bar 40 is between the two branches of element 24, and wall 68 of jaw 52 is attached along the outside of member 24. As FIG. 5 shown, wall 68 is held in position relative to element 24 such that it is always off to the side (the right side, as shown in FIG. 5) of members 24 and 28. Referring to FIG. 6, it will be observed that jaw 52 extends rightward from wall 68. Thus, in the exemplary embodiment depicted in the drawings, jaw 52 always lies off to the right side of members 24 and 28, thereby allowing a cable to be positioned in jaw 52 alongside of device 20, without coming into contact with device 20 (as shown in FIGS. 7 and 8).

Referring now to FIG. 9, exemplary cable 60 comprises an outer layer of insulation 92, which surrounds wires 96, 98, and 102. Wires 96 and 98 are insulated, having insulation layers 97 and 99, respectively. Wire 102 is non-insulated, although it may have a cardboard covering 104. A function of device 20 is to slit outer insulation layer 92, so as to provide individual access to each of wires 96, 98 and 102. Device 20 does not strip insulation layers 97 and 99 during the slitting process, although it may provide the additional function of removing cardboard covering 104 from non-insulated wire 102, in order to provide direct and clean access to non-insulated wire 102. In an exemplary embodiment, cable 60 is Rome cable, although other cable 60 may be other types of multi-wire cable without departing from the spirit and scope of the invention.

Still referring to FIG. 9, it will be observed that insulation layers 97 and 99 are very close to the outer insulation layer 92 that is to be slit by device 20. It is important that neither insulation layers 97 and 99, nor the respective insulated wires 96 and 98 that they protect, be cut during the process of slitting outer insulation layer 92. This goal is accomplished by configuring jaw 52 and claw 56 such that claw 56 pierces outer insulation layer 92 in between two wires. In the exemplary configuration depicted in FIG. 9, claw 56 pierces outer insulation layer 92 between non-insulated wire 102 and insulated wire 98, although it would be equally possible to configure jaw 52 and claw 56 such that claw 56 pierces outer insulation layer 92 between non-insulated wire 102 and insulated wire 96.

Continuing with the exemplary configuration depicted, it will be observed that bottom wall 72 of U-shaped recess 76 (shown in FIG. 4) is slanted. This slant has the effect of positioning wire 98 and its insulation 99 out of the way of the sharp cutting end 80 of claw 56, thereby preventing either wire 98 or insulation 99 from coming into contact with sharp cutting end 80. Moreover, claw 56 is shaped in a way that helps to prevent it from coming into contact with the wires inside of cable 60. Specifically, claw 56 has curved surfaces 88 and 89 (shown in FIG. 3). Curved surface 89 curves out of the way of wire 98 and insulation 99. Curved surface 88 curves out of the way of non-insulated wire 102 and its cardboard covering 104. As mentioned above, however, it may be beneficial for cardboard covering 104 to be removed during the slitting process. In this case, curved surface 88 could have a different curvature, such that it avoids non-insulated wire 102 during the slitting process, but comes into contact with cardboard covering 104. It will also be observed that when jaw 52 and claw 56 are in the closed position (as shown in FIGS. 6 and 9), sharp cutting end 80 does not touch bottom wall 72 of jaw 52, but rather maintains a distance D (shown in FIG. 6). This is because it is only necessary for claw 56 to descend into cable 60 sufficiently far to pierce outer insulation layer 92. If claw 56 were to descend too far into cable 60, it could cut or damage wires 98 or 102. The distance D is chosen for the size and type of cable 60 that is to be slit by device 20 (e.g., D may be ⅛ inch in the case of 12/2 size romex cable), and is maintained as described above by retainer bar 40.

It will be appreciated by those skilled in the art that slanted bottom wall 72 and curved surfaces 88 and 89 are merely an exemplary configuration of jaw 52 and claw 56 that allows outer insulation layer 92 to be slit without claw 56 coming into contact with the wires inside of cable 60, and other configurations are possible without departing from the spirit and scope of the invention. For example, instead of having curved surfaces 88 and 89, claw 56 could have slanted surfaces angled to avoid wires 98 and 102 (and their insulation 99 and cardboard covering 104, respectively). Alternatively, bottom wall 72 of jaw 52 need not be slanted, although the exemplary slanted configuration shown helps to keep wire 98 and insulation 99 out of the way of claw 56.

In order to slit cable 60 by means of device 20 in accordance with the invention, device 20 is placed in the open position depicted in FIGS. 1 and 7. Next, cable 60 is positioned in U-shaped recess 76 of jaw 52. Because device 20 is in the open position, cable 60 can be positioned in jaw 52 without coming into contact with, or otherwise experiencing interference from, claw 56. After cable 60 has been positioned in jaw 52, device 20 is transformed from the open position shown in FIGS. 1 and 7 to the closed position shown in FIGS. 2 and 8. The arrow in FIG. 7 shows the relative movement of members 24 and 28 (and, thus, of claw 56 and jaw 52) as device 20 moves from the open position to the closed position. The transformation from the open to the closed position is generally accomplished by a user's gripping the portions of members 24 and 28 that are covered by coverings 36 and squeezing members 24 and 28 together. As device 20 moves to the closed position, sharp cutting end 80 of claw 56 comes into contact with outer insulation layer 92 substantially perpendicularly to cable 60, thereby piercing outer insulation layer 92. The user, who is still holding onto device 20 with one hand, holds cable 60 with the other hand and pulls cable 60 and device 20 in opposite directions, thereby causing cable 60 to be pulled through jaw 52, with claw 56 slitting outer insulation layer 92. The direction of movement of cable 60 alongside device 20 is shown by the arrow in FIG. 8. Once a sufficient length of outer insulation layer 92 has been slit, device 20 is manually transformed to the open position, thereby removing claw 56 from contact with cable 60 and allowing cable 60 to be removed from jaw 52.

It will be observed at this point that the plier-like apparatus depicted in the drawing is an exemplary means for transforming the relative position of jaw 52 and claw 56 from an open position (in which jaw 52 and claw 56 are separate so as to allow a cable to be inserted into jaw 52 without interference from claw 56) and closed position (in which claw 56 is brought into contact with the cabled positioned in jaw 52 so as to slit the cable). Jaw 52 and claw 56 could also be mounted to a different type of hand tool capable of transforming them between open and closed positions, or to an electric device that uses a motor to open and close jaw 52 and claw 56. Moreover, jaw 52 and claw 56 could be detachably mounted to the device used to transform them between the open and closed positions, so as to make them replaceable with a different jaw and claw for use with a differently shaped and/or sized cable.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art having the benefit of the teachings of this specification, may effect numerous modifications thereto and changes may be made without departing from the scope and spirit of the invention in its aspects.

I claim:

1. A device for slitting insulation on a cable, said device comprising:
    a jaw into which said cable can be positioned, wherein said jaw comprises a pair of side walls and a bottom wall;
    a claw having at least a first surface, a second surface, and a cutting end, said cutting end being defined by a vertex at which said first and second surfaces meet, at least one of said first and second surfaces being curved; and
    a component which transforms the relative position of said jaw and said claw from a first configuration to a second configuration, said jaw and said claw each being attached to said component;
    wherein said component brings said claw in to contact with said cable in a generally perpendicular direction when said component transforms said jaw and said claw from said first configuration to said second configuration when said cable is positioned in said jaw, said claw being disposed between said side walls when said claw is in said second configuration.

2. The device of claim 1, wherein said component comprises a hand-operable component.

3. The device of claim 2, wherein said component comprises first and second members rotatable relative to each other, wherein said claw is attached to said first member, wherein said jaw is attached to said second member, and whereby the rotating action of said first and second members transforms said jaw and said claw from between said first configuration and said second configuration.

4. The device of claim 3, wherein said jaw is attached to said second member in a position offset from the planes in which said first and second members He, such that said cable does not come into contact with said first and second members as said cable moves through said jaw.

5. A device for slitting insulation on a cable, said device comprising:
    a jaw into which said cable may be positioned, wherein said jaw comprises a pair of side walls and a bottom wall, said bottom wall being slanted relative to said side walls;
    a claw; and
    a component which transforms the relative position of said jaw and said claw from a first configuration to a second configuration, said jaw and said claw each being attached to said component;

wherein said component brings said claw into contact with said cable in a generally perpendicular direction when said component transforms said jaw and said claw from said first configuration to said second configuration when said cable is positioned in said jaw.

6. A device for slitting insulation on a cable, said device comprising:

a jaw into which said cable can be positioned, wherein said jaw comprises a pair of side walls and a bottom wall, said bottom wall being slanted relative to said side walls;

a claw; and means for moving said jaw and said claw between first and second positions relative to each other, wherein said cable can be positioned into said jaw without interference from said claw when said jaw and said claw are in said first position, and wherein said claw pierces said cable when the said jaw and said claw move from said first position to said second position.

7. The device of claim 6, wherein said jaw and said claw are detachably mounted to said moving means.

8. The device of claim 6, wherein said jaw is attached to said moving means in an offset position such that said cable does not come into contact with said moving means as said cable moves through said jaw.

9. A device for slitting insulation on a cable, said device comprising:

a jaw into which said cable can be positioned, wherein said jaw comprises a pair of side walls and a bottom wall;

a claw having at least a first surface, a second surface, and a cutting end, said cutting end being defined by a vertex at which said first and second surfaces meet, at least one of said first and second surfaces being curved; and means for moving said jaw and said claw between first and second positions relative to each other, wherein said cable can be positioned into said jaw without interference from said claw when said jaw and said claw are in said first position, said claw being disposed between said side walls when said claw is in said second position, and wherein said claw pierces said cable when said jaw and said claw move from said first position to said second position.

10. The device of claim 9, wherein said jaw and said claw are detachably mounted to said moving means.

11. The device of claim 9, wherein said jaw is attached to said moving means in an offset position such that said cable does not come into contact with said moving means as said cable moves through said jaw.

12. The device of claim 9, wherein said means for moving comprises a hand-operable component.

13. The device of claim 12, wherein said means for moving comprises first and second members rotatable relative to each other, wherein said claw is attached to said first member, wherein said jaw is attached to said second member, and whereby the rotating action of said first and second members transforms said jaw and said claw from between said first position and said second position.

14. The device of claim 13, wherein said jaw is attached to said second member in a position offset from the planes in which said first and second members lie, such that said cable does not come into contact with said first and second members as said cable moves through said jaw.

15. A device for slitting insulation on a cable, said device comprising:

a jaw into which said cable can be positioned, wherein said jaw comprises a pair of side walls and a bottom wall, said bottom wall being slanted relative to said side walls; and a claw;

wherein said claw is movable between first and second positions relative to said jaw, wherein said claw in said first position is distant from said jaw so as to permit said cable to be positioned in said jaw without touching said claw, and wherein said claw pierces said cable as said claw moves from said first position to said second position.

16. The device of claim 15, further comprising a component having first and second members which rotate relative to each other, wherein said claw is attached to said first member, wherein said jaw is attached to said second member, and whereby said claw moves between said first and second positions relative to said jaw by a rotating action of said first and second members.

17. The device of claim 16, wherein said jaw is attached to said second member in a position offset from the planes in which said first and second members lie, such that said cable does not come into contact with said first and second members as said cable moves through said jaw.

18. A device for slitting insulation on a cable, said device comprising:

a jaw into which said cable can be positioned, wherein said jaw comprises a pair of side walls and a bottom wall; and a claw having at least a first surface, a second surface, and a cutting end, said cutting end being defined by a vertex at which said first and second surfaces meet, at least one of said first and second surfaces being curved; wherein said claw is movable between first and second positions relative to said jaw, wherein said claw in said first position is distant from said jaw so as to permit said cable to be positioned in said jaw without touching said claw, said claw being disposed between said side walls when said claw is in said second position, and wherein said claw pierces said cable as said claw moves from said first position to said second position.

19. The device of claim 18, further comprising a component having first and second members which rotate relative to each other, wherein said claw is attached to said first member, wherein said jaw is attached to said second member, and whereby said claw moves between said first and second positions relative to said jaw by a rotating action of said first and second members.

20. The device of claim 19, wherein said jaw is attached to said second member in a position offset from the planes in which said first and second members lie, such that said cable does not come into contact with said first and second members as said cable moves through said jaw.

* * * * *

UNITED STATES PATENT AND TRADEMARK OFFICE
CERTIFICATE OF CORRECTION

PATENT NO.    : 6,502,310 B1
DATED         : January 7, 2003
INVENTOR(S)   : Christopher J. Shaw It is certified that error appears in the above-identified patent and that said Letters Patent is hereby corrected as shown below:

Column 6,
Line 53, the word "He" should actually be typed as the word -- lie. --

Signed and Sealed this

Twenty-eighth Day of October, 2003

JAMES E. ROGAN
*Director of the United States Patent and Trademark Office*